United States Patent
Zhang et al.

(10) Patent No.: US 8,315,524 B2
(45) Date of Patent: Nov. 20, 2012

(54) ELECTRO-OPTIC CONVERSION MODULE, OPTIC-ELECTRO CONVERSION MODULE AND CONVERSION METHODS THEREOF

(75) Inventors: Naisheng Zhang, Shenzhen (CN); Changzheng Su, Shenzhen (CN); Xingyue Sha, Shenzhen (CN); Li Chen, legal representative, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 518 days.

(21) Appl. No.: 12/554,224

(22) Filed: Sep. 4, 2009

(65) Prior Publication Data

US 2010/0086308 A1    Apr. 8, 2010

Related U.S. Application Data

(63) Continuation of application No. PCT/CN2008/070338, filed on Feb. 21, 2008.

(30) Foreign Application Priority Data

Mar. 5, 2007  (CN) .......................... 2007 1 0027058

(51) Int. Cl.
*H04J 14/02* (2006.01)
(52) U.S. Cl. ............. 398/79; 398/83; 398/155; 398/202
(58) Field of Classification Search .................... 398/79, 398/202, 82, 155
See application file for complete search history.

(56) References Cited

U.S. PATENT DOCUMENTS 7,276,684 B2 * 10/2007 Misek ....................... 250/214 R
2002/0186430 A1   12/2002 Halgren et al.

| 2003/0215239 | A1 * | 11/2003 | Joo et al. .......................... 398/83 |
| 2005/0157976 | A1 * | 7/2005 | Furukawa et al. ............... 385/24 |
| 2005/0191056 | A1 * | 9/2005 | Coffey ............................. 398/79 |
| 2006/0280511 | A1 * | 12/2006 | Futami ........................... 398/209 |

(Continued)

FOREIGN PATENT DOCUMENTS

CN    1554139    12/2004

(Continued)

OTHER PUBLICATIONS

Kim S-Y et al: Upgrading WDM Networks Using Ultradense WDM Channel Groups' IEEE Photonics Technology Letters, IEEE Service Center,Piscataway,NJ US LNKD- DOI:10.1108/LPT . XP011115572, dated Aug. 1, 2004 ; total 3 pages.

(Continued)

*Primary Examiner* — M. R. Sedighian
(74) *Attorney, Agent, or Firm* — Conley Rose, P.C.; Grant Rodolph; Rayhao Chung

(57) ABSTRACT

An electro-optic conversion module (30) is disclosed, including: an electric interface unit (31) configured to receive multiple electric signals to be converted and transmit each electric signal to be converted to a corresponding electro-optic conversion unit (32); electro-optic conversion units (32) configured to convert the electric signals from the electric interface unit (31) into optical signals; a multiplexer unit (33) configured to multiplex the optical signals from the electro-optic conversion units (32) into a wavelength division multiplexed signal; and an optical interface unit (37). An optic-electro conversion module and the conversion methods are also disclosed in the present disclosure. With the electro-optic conversion module (30), the optic-electro conversion module and the conversion methods of the present disclosure, the electro-optic conversions for multiple electric signals or the optic-electro conversions for multiple optical signals may be achieved in the same module.

13 Claims, 5 Drawing Sheets

U.S. PATENT DOCUMENTS

2007/0014509 A1* 1/2007 Kish et al. .................. 385/14

FOREIGN PATENT DOCUMENTS

| CN | 1839575 | 9/2006 |
|---|---|---|
| CN | 101039161 | 9/2007 |

OTHER PUBLICATIONS

Brian E Lemoff et al: "MAUI: Enabling Fiber-to-the-Processor With parallel Multiwavelength Optical Interconnects" Journal of Lightwave Technology, IEEE Service Center,New York, NY,US LNKD- DOI:10.1109/ JLT.2004.833251, XP011118631, dated Sep. 1, 2004; total 11 pages.

Welch D R et al: "Optical system performance of large-scale photonic intergrated circuits" XP010876580,dated May 22,2005; total 4 pages.

Office action issued in corresponding Chinese patent application No. 200710027058.5, dated Oct. 30, 2009; and partial English translation therein; total 6 pages.

Search report issued in corresponding European patent application No. 08706711.2, dated Sep. 10, 2010; total 15 pages.

Written opinion issued in corresponding PCT application No. PCT/CN2008/070338, dated Jun. 5, 2008; total 5 pages.

Foreign Communication from a Counterpart Application, European Application No. 08 706 711.2, mailed Jun. 18, 2012, 5 pages.

* cited by examiner

ELECTRO-OPTIC CONVERSION MODULE, OPTIC-ELECTRO CONVERSION MODULE AND CONVERSION METHODS THEREOF

CROSS REFERENCE

The present application is a continuation of International Patent Application No. PCT/CN2008/070338, filed Feb. 21, 2008, which claims priority to Chinese Patent Application No. 200710027058.5, filed Mar. 5, 2007, both of which are hereby incorporated by reference in their entireties.

FIELD OF THE INVENTION

The present disclosure relates to optical communications, and more particularly, to electro-optic conversion modules, optic-electro conversion modules, and conversion methods thereof.

BACKGROUND

With the progressive growing of the fiber optic communication techniques, the wavelength division multiplexing (WDM) optical transmission systems are increasingly deployed. With the wavelength division multiplexing technique, a plurality of optical signals having different wavelengths are multiplexed into one (wavelength division multiplexed) signal for transmission through the optical fiber, improving the transmission bandwidth of the communication network effectively.

Referring to FIG. 1, a schematic block diagram of a transmitting device in a wavelength division multiplexing optical transmission system of the prior art is illustrated. The transmitting device includes a plurality of optical interfaces 11, a plurality of electro-optic conversion modules 12 for performing electro-optic conversions on the various electric signals, and a multiplexer 13 for wavelength division multiplexing the optical signals of various wavelengths from the electro-optic conversion modules 12 into one optical signal. Each optical interface 11 couples an optical signal to the multiplexer 13 via a corresponding fiber optic patch cord.

Referring to FIG. 2, a schematic block diagram of a receiving device in a wavelength division multiplexing optical transmission system in the prior art is illustrated. The receiving device includes a demultiplexer 21 for demultiplexing the wavelength division multiplexed signal to be converted into various wavelength optical signals, a plurality of optical interfaces 22, and a plurality of optic-electro conversion modules 23 for converting the various wavelength optical signals into electric signals. The demultiplexer couples each optical signal to an optical interface 22 via a corresponding fiber optic patch cord.

In the above wavelength division multiplexing system in the prior art, for the electric signals to be converted, a corresponding number of optical interfaces and optic modules are required in the transmitting device to achieve the electro-optic conversions for the various electric signals to be converted; and for the optical signals to be converted, a corresponding number of optical interfaces and optic modules are also required in the receiving device to achieve the optic-electro conversions for the various optical signals to be converted. Generally, a great number of electric signal conversions or optical signal conversions are required in the transmitting and receiving devices of the wavelength division multiplexing system. Therefore, a large number of optical interfaces and optic modules are required in the transmitting or receiving device of the wavelength division multiplexing system in the prior art to achieve the corresponding electro-optic conversions or optic-electro conversions, so that the transmitting or receiving device has a large volume, much internal fiber optic patch cord data and complex connections, thereby being impedimental to improving the integrity of the devices, reducing the power consumption of the devices, or simplifying the operation or maintenance.

SUMMARY

Electro-optic conversion modules, optic-electro conversion modules, and conversion methods are provided according to embodiments of the present disclosure, wherein the electro-optic conversion for multiple electric signals or the optic-electro conversion for multiple optical signals may be achieved in the same electro-optic conversion module or optic-electro conversion module.

An electro-optic conversion module is provided according to an embodiment of the present disclosure. The electro-optic conversion module includes an electric interface unit, a plurality of electro-optic conversion units coupled to the electric interface unit, a multiplexer unit coupled to the plurality of electro-optic conversion units, and an optical interface unit, wherein the electric interface unit is configured to receive multiple electric signals to be converted, and transmit each electric signal to be converted to a corresponding electro-optic conversion unit;

the electro-optic conversion units are configured to convert the electric signals from the electric interface unit into optical signals;

the multiplexer unit is configured to multiplex the optical signals from the electro-optic conversion units into a wavelength division multiplexed signal; and the optical interface unit is configured to output an optical signal from the multiplexer unit.

An optic-electro conversion module is provided according to an embodiment of the present disclosure. The optic-electro conversion module includes a demultiplexer unit, a plurality of optic-electro conversion units coupled to the demultiplexer unit, and an electric interface unit coupled to the plurality of optic-electro conversion units, wherein the demultiplexer unit is configured to demultiplex a received wavelength division multiplexed signal to be converted into multiple wavelength optical signals to be converted, and transmit each wavelength optical signal to be converted to a corresponding optic-electro conversion unit;

the optic-electro conversion units are configured to convert the wavelength optical signals to be converted from the demultiplexer unit into electric signals; and the electric interface unit is configured to output the electric signal from each optic-electro conversion unit.

An electro-optic conversion method is provided according to an embodiment of the present disclosure. The electro-optic conversion method includes:

receiving multiple electric signals to be converted, and transmitting the electric signals to be converted to corresponding electro-optic conversion units;

converting, by the electro-optic conversion units, the electric signals to be converted into optical signals; and multiplexing the optical signals from the electro-optic conversion units into a wavelength division multiplexed signal.

An optic-electro conversion method is provided according to an embodiment of the present disclosure. The optic-electro conversion method includes:

demultiplexing a received wavelength division multiplexed signal to be converted into multiple wavelength optical signals to be converted, and transmitting each wavelength optical signal to be converted to a corresponding optic-electro conversion unit; and converting, by the optic-electro conversion unit, the optical signal to be converted into an electric signal.

The electro-optic conversion module according to the embodiment of the present disclosure receives various electric signals to be converted via the electric interface unit, and transmits the various electric signals to be converted to the corresponding electro-optic conversion units, converts the electric signals from the electric interface unit into optical signals via the electro-optic conversion units, and multiplexes the optical signals from the electro-optic conversion units into a wavelength division multiplexed signal via the multiplexer unit. The optic-electro conversion module according to the embodiment of the present disclosure demultiplexes the received wavelength division multiplexed signal to be converted into various wavelength optical signals to be converted via the demultiplexer unit, transmits each wavelength optical signal to be converted to a corresponding optic-electro conversion unit, converts the optical signal to be converted from the demultiplexer unit into an electric signal via the optic-electro conversion unit, and outputs the electric signal from each optic-electro conversion unit via the electric interface unit. With the electro-optic conversion module, the optic-electro conversion module and the conversion methods provided according to the embodiments of the present disclosure, the electro-optic conversions for multiple electric signals or the optic-electro conversions for multiple optical signals are achieved in the same module, thereby improving the integrity of the device, minimizing the volume of the device, simplifying the internal fiber optic patch cords, reducing the power consumption of the device, and improving the reliability of the device.

DETAILED DESCRIPTION

For purposes of clarifying the technical schemes and advantages of the embodiments of the present disclosure, the embodiments of the present disclosure will be further illustrated in detail in conjunction with the accompanying drawings and by reference to some exemplary embodiments.

Figure 1:
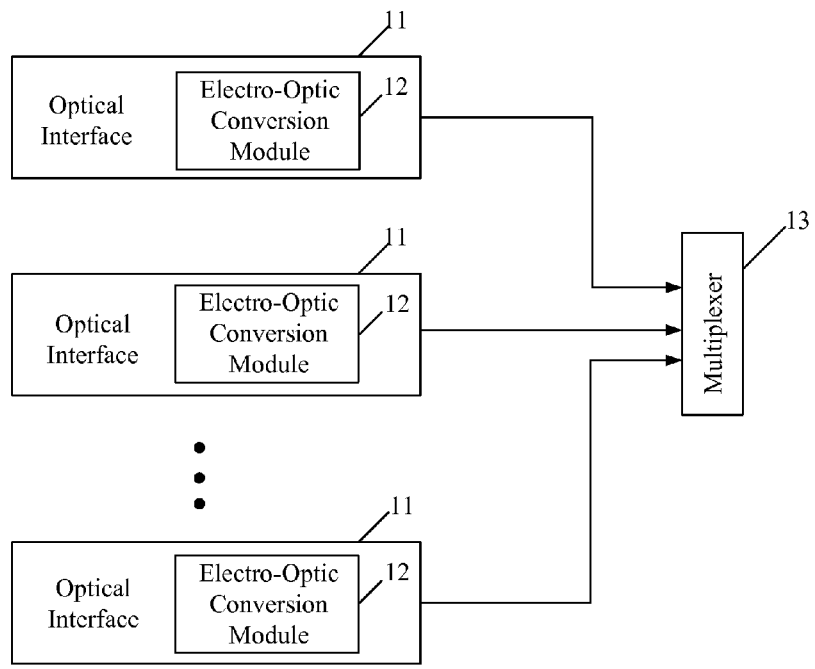
FIG. 1 is a schematic block diagram of a transmitting device in a wavelength division multiplexing system in the prior art.
Figure 2:
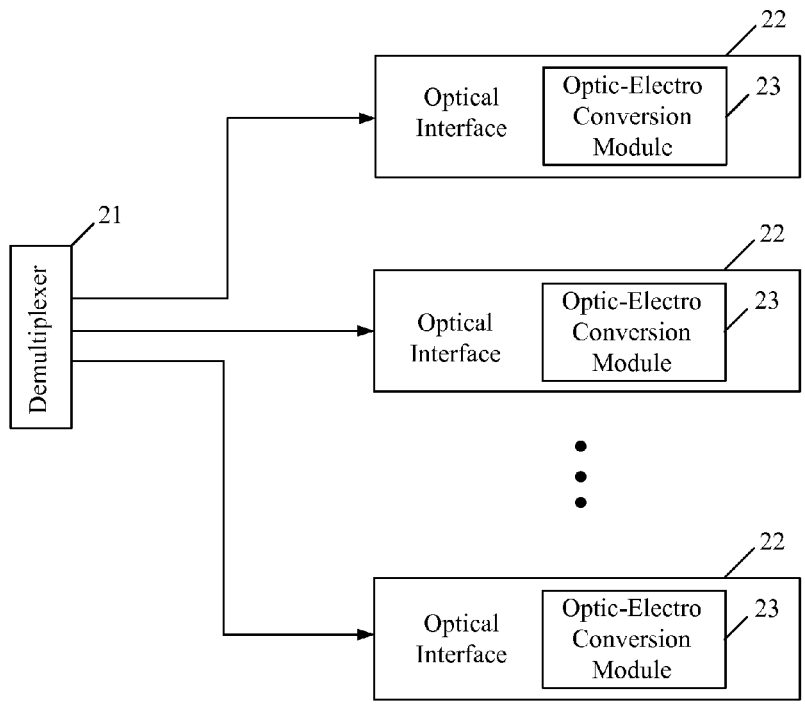
FIG. 2 is a schematic block diagram of a receiving device in a wavelength division multiplexing system in the prior art.
Figure 3:
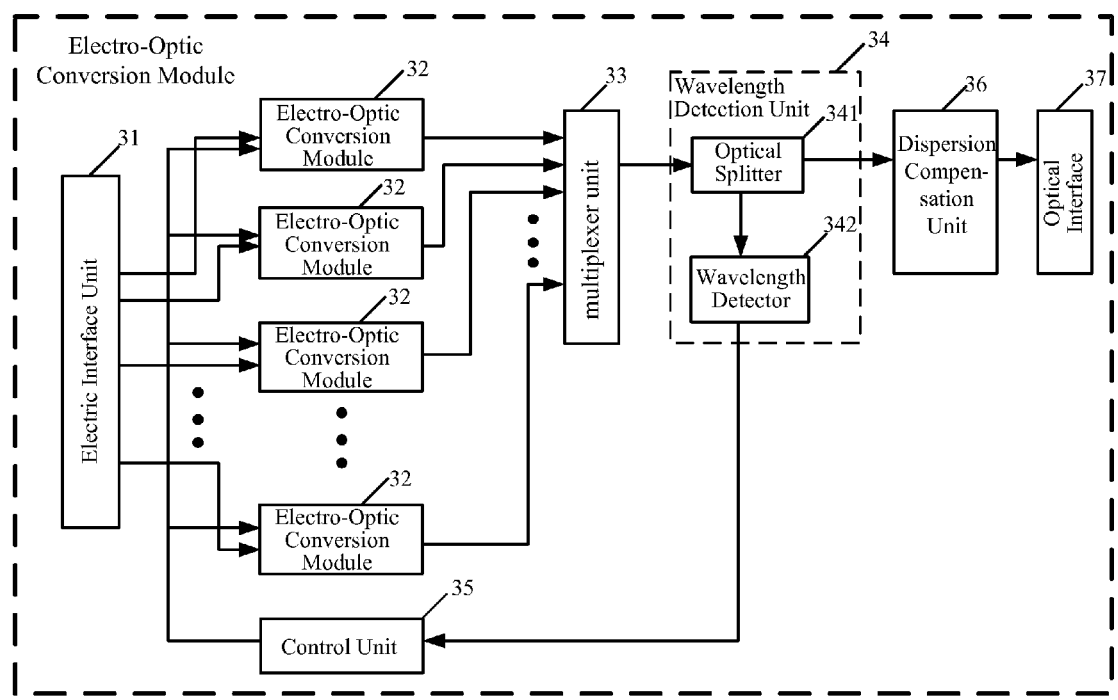
FIG. 3 is a schematic block diagram of an electro-optic conversion module according to an embodiment of the present disclosure.

Referring to FIG. 3, a schematic block diagram of an electro-optic conversion module according to an embodiment of the present disclosure is illustrated. As shown in FIG. 3, the electro-optic conversion module according to the embodiment of the present disclosure mainly includes an electric interface unit 31, a plurality of electro-optic conversion units 32 coupled to the electric interface unit 31, a multiplexer unit 33 coupled to the plurality of electro-optic conversion units 32, a wavelength detection unit 34, a control unit 35, a dispersion compensation unit 36, and an optical interface 37. The functionalities of the units and the relationships between thereof will be illustrated in detail below.

The electric interface unit 31 is mainly configured to receive multiple electric signals to be converted, and transmits each electric signal to be converted to a corresponding electro-optic conversion unit 32.

Here, the electric signal to be converted is a service data electric signal to be converted, and the electric interface unit 31 implements the electrical connection between the electro-optic conversion module of the embodiment of the present disclosure and a corresponding physical host. In the specific implementation, the electrical connection includes a power feeder, a digital control signal, an analog signal, the service data electric signal to be converted, etc. Since the electric signal to be converted in the embodiment of the present disclosure, i.e., the service data electric signal to be converted, is an RF high frequency signal, in order to avoid the effect of variants and interferences on the signal quality during the connection and transmission, the RF high frequency signal such as the service data electric signal to be converted in the embodiment of the present disclosure is typically processed by pre-emphasis in the generation of the signal, so as to compensate the optical signal to some extent according to the transmission gain (or loss) characteristics of the transmission channel of the optical signal in advance. In the specific implementation, the pre-emphasis processing is similar to that in the prior art and will not be repeated here. The RF high frequency signal such as the service data electric signal to be converted is transmitted in terms of a differential micro-strip line during transmission. In a particular embodiment, the transmission signal distribution at the electric socket interface of the electric interface unit 31 is as shown in Table 1 below:

TABLE 1

|     |     |     |     |     |     |     |     |     |     |
| --- | --- | --- | --- | --- | --- | --- | --- | --- | --- |
|     | gnd | gnd |     |     | gnd | gnd |     |     |     |
| gnd | S   | S   | gnd | gnd | S   | S   | gnd | gnd |     |
|     | gnd | gnd |     |     | gnd | gnd |     |     |     |
|     |     |     | gnd | gnd |     |     | gnd | gnd |     |
|     |     | gnd | S   | S   | gnd | gnd | S   | S   | gnd |
|     |     |     | gnd | gnd |     |     | gnd | gnd |     |

In the table above, S represents an RF high frequency signal, gnd represents a reference ground signal, and the blanks represent other signals, such as direct currents, low frequency or power source signals, etc. The distribution of the RF high frequency signals is characterized in that: every two adjacent signals compose a differential signal pair, the differential signal pairs (RF high frequency signals) are surrounded by gnd signals, the differential signal pairs are spaced by at least two pins, and the adjacent differential signal pairs are not corresponding to each other.

The electro-optic conversion unit 32 is configured to convert the electric signal from the electric interface unit 31 into an optical signal.

Here, the electric signal received by the electro-optic conversion unit 32 is a high frequency service data signal. Since the signal channel may not be an ideal wideband response function, i.e., the gain (or loss) of the signal passing through the channel may vary with the frequency of the signal, and since the high frequency service data signal typically includes components of different frequencies, the signal will be distorted after transmission through the channel. The electric signal may be equalized, and clock and data recovered (CDR) before the electro-optic conversion, where the specific implementation is similar to that in the prior art and will not be repeated here.

The multiplexer unit 33 is configured to multiplex the optical signals from the electro-optic conversion units 32 into a wavelength division multiplexed signal.

The wavelength detection unit 34 is configured to detect the wavelength information of each wavelength optical signal in the wavelength division multiplexed signal from the multiplexer unit 33, so that the control unit 35 may generate a control command corresponding to each electro-optic conversion unit according to the detected wavelength information of each wavelength optical signal, thereby enabling each electro-optic conversion unit 32 to adjust the wavelength of the corresponding output optical signal according to the control command.

Here, in the specific implementation, the wavelength detection control unit 34 mainly includes:

an optical splitter 341, configured to split the wavelength division multiplexed signal from the multiplexer unit 33 into a first wavelength division multiplexed signal and a second wavelength division multiplexed signal; and a wavelength detector 342, configured to detect the wavelength information of each wavelength optical signal in the second wavelength division multiplexed signal from the optical splitter 341.

The control unit 35 is configured to control the wavelength of the output optical signal from each electro-optic conversion unit.

Here, in the specific implementation, the control unit 35 generally includes a microprocessor (MCU), which is mainly configured to control the parameters such as the output wavelength, the output power, etc., of the optical signal from each electro-optic conversion unit. For example, in implementation of controlling the output wavelength of the optical signal of each electro-optic conversion unit, the control unit 35 samples, amplifies, and analog-to-digital (AD) converts the wavelength information of each wavelength optical signal detected by the wavelength detection unit 34 into a digital signal corresponding to the output wavelength information of each electro-optic conversion unit 32, and the microprocessor (MCU) compares the digital signal corresponding to the output wavelength information of each electro-optic conversion unit 32 with a predefined data and generates a control command according to the comparison result for controlling the corresponding electro-optic conversion unit 32 to increase, maintain or decrease its output wavelength. The electro-optic modulation parameters, such as the output optical power, extinction ratio, cross-point, etc., of each electro-optic conversion unit 32 are similar to the wavelength control, and the specific implementation and functionalities are the same as or similar to that in the prior art and will not be repeated here.

The dispersion compensation unit 36 is coupled to the optical splitter, and is configured to perform dispersion compensation to the first wavelength division multiplexed signal which is from the optical splitter 341.

Here, the dispersion compensation process is the same as or similar to that in the prior art and will not be repeated here.

The optical interface 37 is configured to output the optical signal from the dispersion compensation unit 36.

As described above, the electro-optic conversion module according to the embodiment of the present disclosure achieves the optic-electro conversions for multiple electric signals in the same module, and the optical signals from the electro-optic conversions are multiplexed through a multiplexer unit, and output through the optical fiber via the same optical interface, thereby effectively improving the integrity of the electro-optic conversion device, decreasing the number of fiber optic patch cords of the electro-optic conversion device, reducing the power consumption of the electro-optic conversion device, minimizing the volume of the electro-optic conversion device, and improving the reliability of the electro-optic conversion device.

Figure 4:
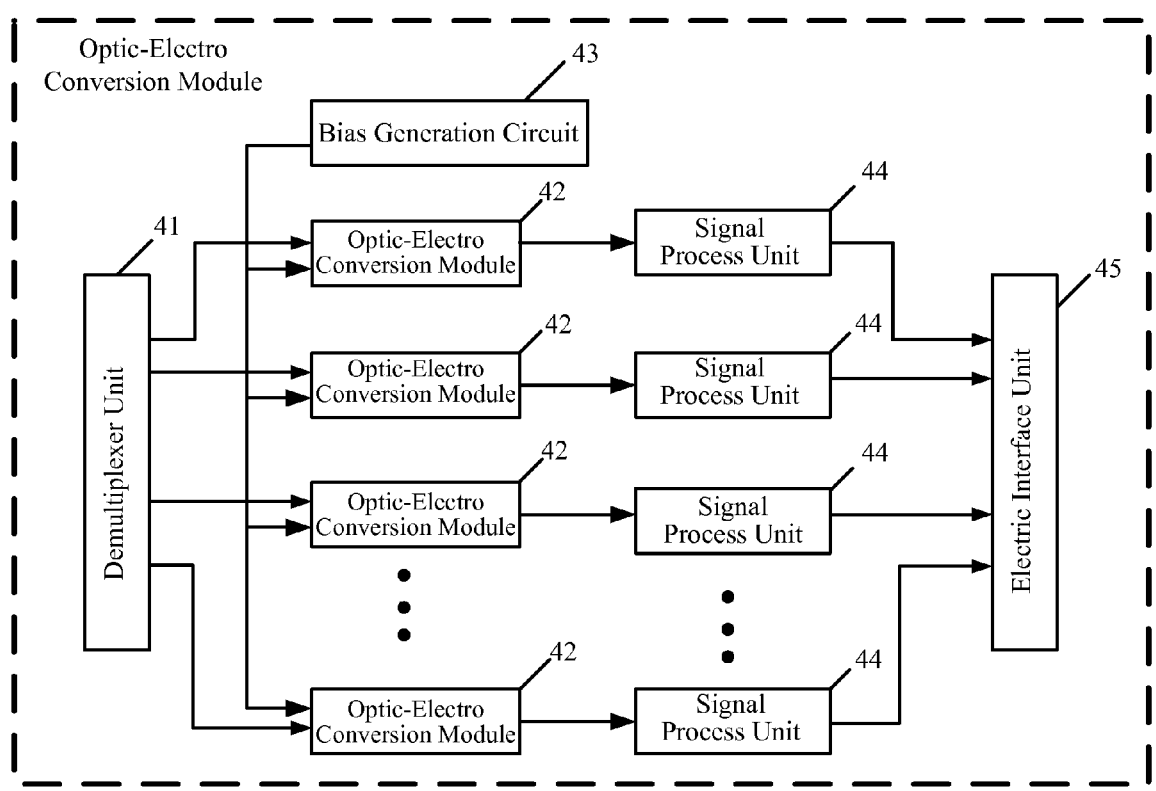
FIG. 4 is a schematic block diagram of an optic-electro conversion module according to an embodiment of the present disclosure.

Referring to FIG. 4, a schematic block diagram of an optic-electro conversion module according to an embodiment of the present disclosure is illustrated. As shown in FIG. 4, the optic-electro conversion module according to the embodiment of the present disclosure mainly includes a demultiplexer unit 41, a plurality of optic-electro conversion units 42 coupled to the demultiplexer unit, a bias generation circuit 43, a plurality of signal process units 44, and an electric interface unit 45 coupled to the plurality of signal process units. The functionalities of the units and the relationships thereof will be described in detail below.

The demultiplexer unit 41 is configured to demultiplex a received wavelength division multiplexed signal to be converted into multiple wavelength optical signals to be converted, and transmits each wavelength optical signal to be converted to a corresponding optic-electro conversion unit.

Each optic-electro conversion unit 42 is configured to convert the optical signal to be converted from the demultiplexer unit into an electric signal.

Here, the electric signal obtained after the optical signal is converted by the optic-electro conversion unit is typically an optical signal in the form of a photo-generated current.

The bias generation circuit 43 is configured to provide a bias voltage for each optic-electro conversion unit.

Here, the bias generation circuit 43 provides a bias voltage for all the optic-electro conversion units uniformly. The various optic-electro conversion units sharing the same bias generation circuit may reduce the complexity of the optic-electro conversion module of the embodiment of the present disclosure, thereby improving the integrity of the module, reducing the power consumption of the device, and facilitating the promotion of the reliability of the electro-optic conversion module.

Each signal process unit 44 is configured to process the electric signal from the optic-electro conversion unit 42 to obtain a service data electric signal.

Here, since the electric signal from the optic-electro conversion unit 42 is an optical signal in the form of a relatively weak photo-generated current, and the photo-generated current signal is an analog signal that is not suitable to be transmitted on the channel, the major function of a signal process unit 44 is to amplify, sample, and clock and data recover the optical signal in the form of a photo-generated current, so as to generate a high frequency service data signal adapted to be transmitted on the channel. In the specific implementation, the signal process unit 44 includes a transimpedance amplifier (TIA), a limiting amplifier, a clock and data recover (CDR), etc.

The electric interface unit 45 is configured to output the service data electric signal from each signal process unit 44.

Here, the function and structure implemented by the electric interface unit 45 is similar to the electric interface unit 32 in the electro-optic conversion module described above in the embodiment of the present disclosure. The distribution of transmission signals at the electric socket interface of the electric interface unit 45 are the same as or similar to the distribution of transmission signals at the electric socket interface of the electric interface unit 32, and will not be repeated here. The RF high frequency signals such as the service data electric signals output from each signal process unit to the socket interface of the electric interface unit 45, as well as between the socket interface of the electric interface unit 45 and the corresponding host are transmitted by differential micro-strip lines.

As described above, the optic-electro conversion module according to the embodiment of the present disclosure demultiplexes the wavelength division multiplexed signal to be converted into multiple wavelength optical signals in the same module, converts each wavelength optical signal into an electric signal and outputs it by a differential micro-strip line through the same electric socket interface, thereby effectively improving the integrity of the optic-electro conversion device, decreasing the number of fiber optic patch cords of the optic-electro conversion device, reducing the power consumption of the optic-electro conversion device, minimizing the volume of the optic-electro conversion, and improving the reliability of the optic-electro conversion device.

Furthermore, an electro-optic conversion method is provided according to an embodiment of the present disclosure, which will be described in detail below by reference to an embodiment.

Figure 5:
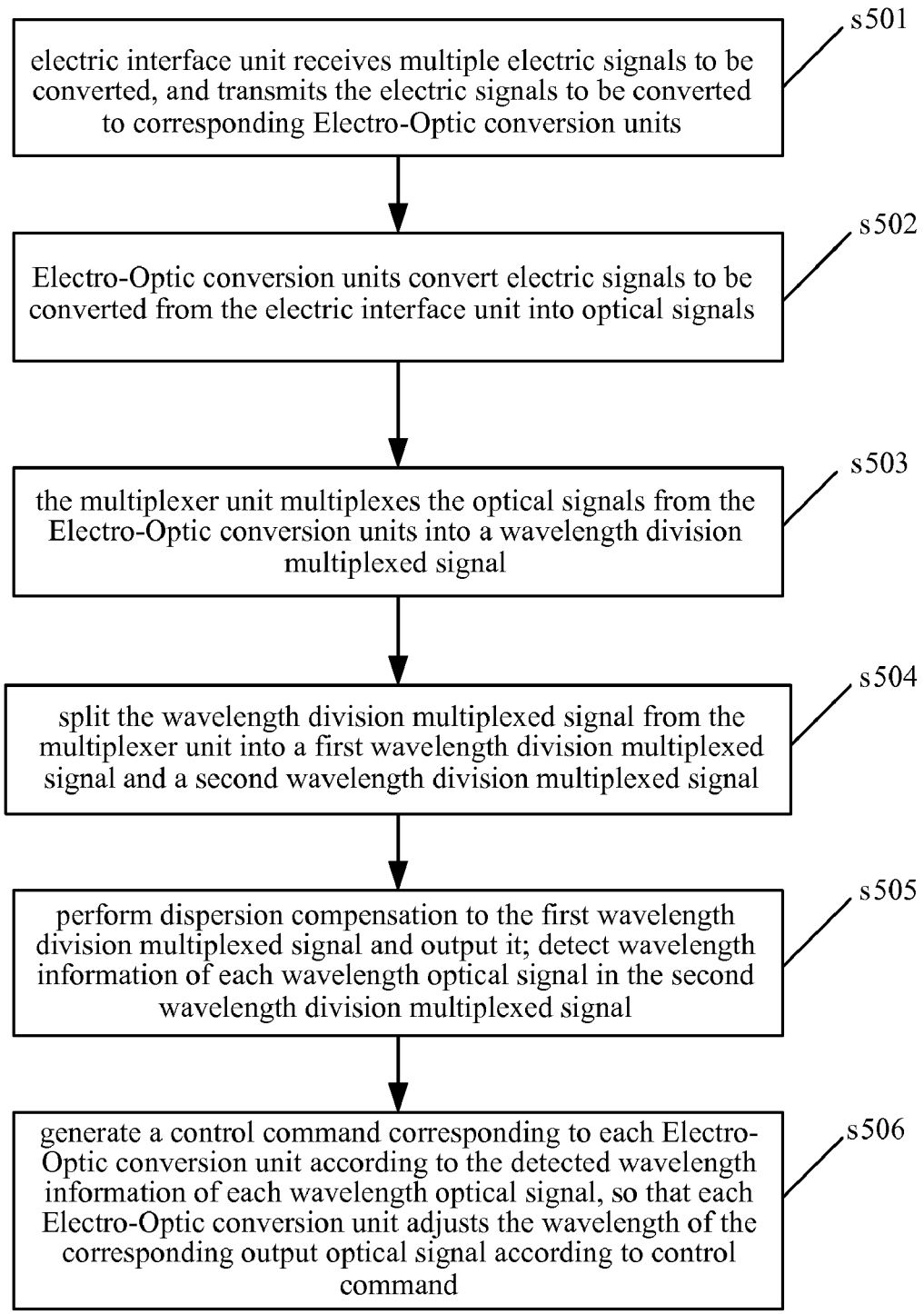
FIG. 5 is a schematic flowchart of an electro-optic conversion method according to an embodiment of the present disclosure.

Referring to FIG. 5, a schematic flowchart of an electro-optic conversion method according to an embodiment of the present disclosure is illustrated. As shown in FIG. 5, this embodiment is implemented as follow.

In step s501, an electric interface unit receives multiple electric signals to be converted, and transmits each electric signal to be converted to a corresponding electro-optic conversion unit.

Here, the electric signal to be converted is a service data electric signal to be converted, and the electric interface unit implements the electrical connection between the electro-optic conversion module of the embodiment of the present disclosure and a corresponding physical host. In the specific implementation, the electrical connection includes a power feeder, a digital control signal, an analog signal, the service data electric signal to be converted, etc. Since the electric signal to be converted in the embodiment of the present disclosure, i.e., the service data electric signal to be converted, is an RF high frequency signal, in order to avoid the effect of variants and interferences on the signal quality during the connection and transmission, the RF high frequency signal such as the service data electric signal to be converted in the embodiment of the present disclosure is typically processed by pre-emphasis in the generation of the signal, so as to compensate the optical signal to some extent according to the transmission gain (or loss) characteristics of the transmission channel of the various optical signal in advance. In the specific implementation, the pre-emphasis processing is similar to that in the prior art and will not be repeated here. The RF high frequency signal such as the service data electric signal to be converted is transmitted in terms of differential micro-strip lines during transmission. In a specific embodiment, the transmission signal distribution at the electric socket interface of the electric interface unit is as shown in Table 2 below:

TABLE 2

|     |     | gnd | gnd |     |     |     | gnd | gnd |     |     |
| --- | --- | --- | --- | --- | --- | --- | --- | --- | --- | --- |
| gnd | S   | S   | gnd | gnd | S   | S   | gnd | gnd |     |     |
|     |     | gnd | gnd |     |     |     | gnd | gnd |     |     |
|     |     |     | gnd | gnd |     |     |     | gnd | gnd |     |
|     | gnd | S   | S   | gnd | gnd | S   | S   | gnd |     |     |
|     |     |     | gnd | gnd |     |     |     | gnd | gnd |     |

In the table above, S represents an RF high frequency signal, gnd represents a reference ground signal, and the blanks represent other signals, such as direct currents, low frequency or power source signals, etc. The distribution of the RF high frequency signals is characterized in that: every two adjacent signals compose a differential signal pair, the differential signal pairs (RF high frequency signals) are surrounded by gnd signals, the differential signal pairs are spaced by at least two pins, and the adjacent differential signal pairs are not corresponding to each other.

In step s502, the electric signal to be converted from the electric interface unit is converted into an optical signal by an electro-optic conversion unit.

Here, the electric signal received by the electro-optic conversion unit is a high frequency service data signal. Since the signal channel may not be an ideal wideband response function, i.e., the gain (or loss) of the signal passing through the channel may vary with the frequency of the signal, and since the high frequency service data signal typically includes components of different frequencies, the signal will be distorted after transmission through the channel. The electric signal may be equalized, and clock and data recovered (CDR) before the electro-optic conversion, where the specific implementation is similar to that in the prior art and will not be repeated here.

In step s503, a multiplexer unit multiplexes the optical signals from the electro-optic conversion units into a wavelength division multiplexed signal.

In step s504, the wavelength division multiplexed signal from the multiplexer unit is split into a first wavelength division multiplexed signal and a second wavelength division multiplexed signal.

In step s505, performing dispersion compensation to the first wavelength division multiplexed signal and outputting it; the wavelength information of each wavelength optical signal in the second wavelength division multiplexed signal is detected.

Here, the dispersion compensation process is similar to that in the prior art, and will not be repeated here.

In step s506, a control command corresponding to each electro-optic conversion unit is generated according to the detected wavelength information of each wavelength optical signal, so that each electro-optic conversion unit may adjust the wavelength of the corresponding output optical signal according to the control command.

Accordingly, an optic-electro conversion method is also provided according to an embodiment of the present disclosure, which will be described in detail below by embodiment.

Figure 6:
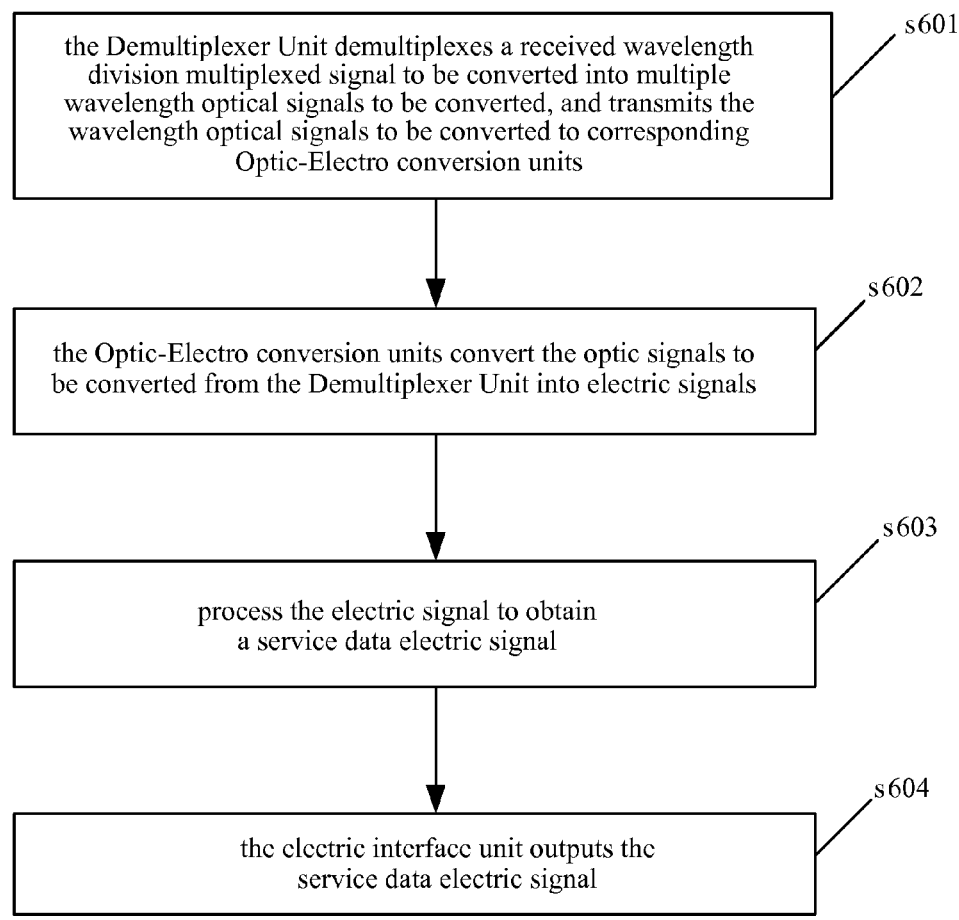
FIG. 6 is a schematic flowchart of an optic-electro conversion method according to an embodiment of the present disclosure.

Referring to FIG. 6, a schematic flowchart of an optic-electro conversion method according to an embodiment of the present disclosure is illustrated. As shown in FIG. 6, this embodiment is implemented as follow.

In step s601, a demultiplexer unit demultiplexes a received wavelength division multiplexed signal to be converted into multiple wavelength optical signals to be converted, and transmits each wavelength optical signal to be converted to a corresponding optic-electro conversion unit.

In step s602, the optic-electro conversion unit converts the optical signal to be converted from the demultiplexer unit into an electric signal.

Here, the electric signal obtained after the optical signal is converted by the optic-electro conversion unit is typically an optical signal in the form of a photo-generated current. The various optic-electro conversion units are supplied with a bias voltage by the same bias generation circuit uniformly. The various optic-electro conversion units sharing the same bias generation circuit may effectively reduce the complexity of the optic-electro conversion module of the embodiment of the present disclosure, thereby improving the integrity of the module, reducing the power consumption of the device, and facilitating the improvement of the reliability of the electro-optic conversion module.

In step s603, the electric signal is processed to obtain a service data electric signal.

Here, since the electric signal from the optic-electro conversion unit is an optical signal in the form of a relatively weak photo-generated current, and the photo-generated current signal is an analog signal that is not suitable to be transmitted on the channel, the processing for the electric signal in step s603 is to amplify, sample, clock and data recover the optical signal in the form of a photo-generated current, so as to generate a high frequency service data signal adapted to be transmitted on the channel.

In step s604, the service data electric signal is output by an electric interface unit.

The electro-optic conversion module according to the embodiment of the present disclosure receives various electric signals to be converted via the electric interface unit, and transmits the various electric signals to be converted to the corresponding electro-optic conversion units, converts the electric signals from the electric interface unit into optical signals via the electro-optic conversion units, and multiplexes the optical signals from the electro-optic conversion units into a wavelength division multiplexed signal by the multiplexer unit. The optic-electro conversion module according to the embodiment of the present disclosure demultiplexes the received wavelength division multiplexed signal to be converted into various wavelength optical signals to be converted by the demultiplexer unit, transmits each wavelength optical signal to be converted to a corresponding optic-electro conversion unit, converts the optical signal to be converted from the demultiplexer unit into an electric signal via the optic-electro conversion unit, and outputs the electric signal from each optic-electro conversion unit via the electric interface unit. With the electro-optic conversion module, the optic-electro conversion module and the conversion methods provided according to the embodiments of the present disclosure, the electro-optic conversions for multiple electric signals or the optic-electro conversions for multiple optical signals are achieved in the same module, thereby improving the integrity of the device, minimizing the volume of the device, simplifying the internal fiber optic patch cords, reducing the power consumption of the device, and improving the reliability of the device.

The foregoing are merely preferred embodiments of the present disclosure. It shall be noted that improvements and modifications may be made by those with ordinary skills in the art without departing from the principle of the present disclosure. Such improvements and modifications shall be construed as falling within the scope of the present disclosure.

What is claimed is:

1. An electro-optic conversion module, comprising:
an electric interface unit;
a plurality of electro-optic conversion units coupled to the electric interface unit;
a multiplexer unit coupled to the plurality of electro-optic conversion units; and
an optical interface unit,
wherein the electric interface unit is configured to receive multiple electric signals to be converted, and transmit each electric signal to be converted to a corresponding electro-optic conversion unit,
wherein the electro-optic conversion units are configured to convert the electric signals from the electric interface unit into optical signals,
wherein the multiplexer unit is configured to multiplex the optical signals from the electro-optic conversion units into a wavelength division multiplexed signal,
wherein the optical interface unit is configured to output an optical signal from the multiplexer unit,
wherein the electric interface unit comprises an electric socket interface, configured to receive the multiple electric signals, and
wherein in the electric socket interface, input pins for the electric signals to be converted are adjacent to each other, so that every two of the electric signals compose a differential signal pair, pins surrounding the input pins for differential signal pairs are grounded signal pins, and the input pins for the differential signal pairs are spaced by at least two pins.

2. The electro-optic conversion module according to claim 1, further comprising:
a wavelength detection unit, configured to detect wavelength information of each wavelength optical signal in the wavelength division multiplexed signal from the multiplexer unit; and
a control unit, configured to control wavelengths of output optical signals from the electro-optic conversion units,
wherein the control unit adjusts the wavelength of a corresponding output optical signal according to the wavelength information of each wavelength optical signal detected by the wavelength detection unit.

3. The electro-optic conversion module according to claim 2, wherein the wavelength detection unit comprises:
an optical splitter, configured to split the wavelength division multiplexed signal from the multiplexer unit into a first wavelength division multiplexed signal and a second wavelength division multiplexed signal; and
a wavelength detector, configured to detect the wavelength information of each wavelength optical signal in the second wavelength division multiplexed signal from the optical splitter.

4. The electro-optic conversion module according to claim 2, further comprising: a dispersion compensation unit, coupled to the optical splitter and configured to perform dispersion compensation to the first wavelength division multiplexed signal from the optical splitter, wherein the optical interface unit outputs an optical signal from the dispersion compensation unit.

5. An optic-electro conversion module, comprising:
a demultiplexer unit;
a plurality of optic-electro conversion units coupled to the demultiplexer unit; and
an electric interface unit coupled to the plurality of optic-electro conversion units,
wherein the demultiplexer unit is configured to demultiplex a received wavelength division multiplexed signal to be converted into multiple wavelength optical signals to be converted, and transmit each wavelength optical signal to be converted to a corresponding optic-electro conversion unit,
wherein the optic-electro conversion units are configured to convert the wavelength optical signals to be converted from the demultiplexer unit into electric signals,
wherein the electric interface unit is configured to output the electric signal from each optic-electro conversion unit,
wherein the electric interface unit comprises an electric socket interface configured to output multiple electric signals, and
wherein in the electric socket interface, input pins for the electric signals to be converted are adjacent to each other, so that each two of the electric signals compose a differential signal pair, pins surrounding the input pins for differential signal pairs are grounded signal pins, and the input pins for the differential signal pairs are spaced by at least two pins.

6. The optic-electro conversion module according to claim 5, further comprising: a bias generation circuit, configured to provide a bias voltage for each optic-electro conversion unit.

7. The optic-electro conversion module according to claim 6, further comprising: a signal process unit, configured to process the electric signal from the optic-electro conversion unit to obtain an electric signal adapted with the electric interface unit.

8. The optic-electro conversion module according to claim 5, further comprising: a signal process unit, configured to process the electric signal from the optic-electro conversion unit to obtain an electric signal adapted with the electric interface unit.

9. An apparatus comprising:
a demultiplexer;
a plurality of electro-optic converters optically coupled to the demultiplexer;
a plurality of signal processors electrically coupled to the electro-optic converters such that the electro-optic converters are located between the signal processors and the demultiplexer, wherein each signal processor is coupled to only one electro-optic converter; and
an electric interface coupled to the signal processors such that the signal processors are located between the electric interface and the electro-optic converters, wherein the electric interface comprises an electric socket interface configured to output multiple electric signals, wherein in the electric socket interface, input pins for the electric signals to be converted are adjacent to each other, so that each two of the electric signals compose a differential signal pair, and
wherein the signal processors are configured to amplify, sample, and clock and data recover the electrical signals emitted by each electro-optic converter.

10. The apparatus of claim 9, wherein the signal processor comprises a transimpedance amplifier, a limiting amplifier, and a clock and data recoverer.

11. The apparatus of claim 9 further comprising a bias generator coupled to the electro-optic converters such that the electro-optic converters are located between the signal processors and the bias generator.

12. The apparatus of claim 9, wherein in the electric socket interface, pins surrounding the input pins for differential signal pairs are grounded signal pins.

13. The apparatus of claim 9, wherein in the electric socket interface, the input pins for the differential signal pairs are spaced by at least two pins.

* * * * *

UNITED STATES PATENT AND TRADEMARK OFFICE
CERTIFICATE OF CORRECTION

PATENT NO. : 8,315,524 B2
APPLICATION NO. : 12/554224
DATED : November 20, 2012
INVENTOR(S) : Naisheng Zhang et al.

It is certified that error appears in the above-identified patent and that said Letters Patent is hereby corrected as shown below:

In the Claims:

Column 11 Line 14 - Claim 8 should read as follows:

The optic-electro conversion module according to claim 6, further comprising: a signal process unit, configured to process the electrical signal from the optic-electro conversion unit to obtain an electric signal adapted with the electric interface unit.

Signed and Sealed this
Twenty-third Day of April, 2013

Teresa Stanek Rea
*Acting Director of the United States Patent and Trademark Office*